Aug. 9, 1932.                A. AEPPLI                 1,870,764
                       HELICAL GEAR GRINDER
                       Filed Dec. 2, 1930            8 Sheets-Sheet 5
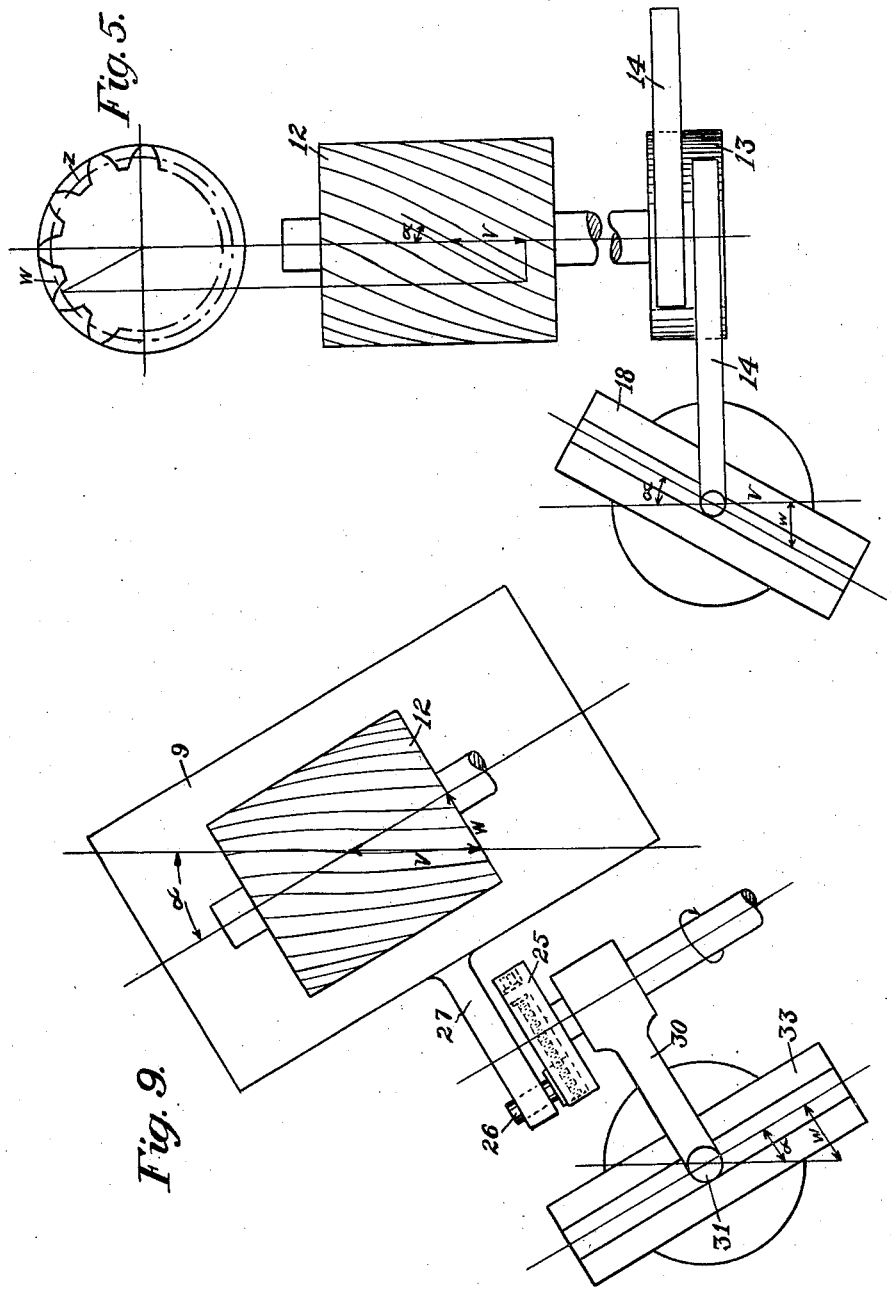

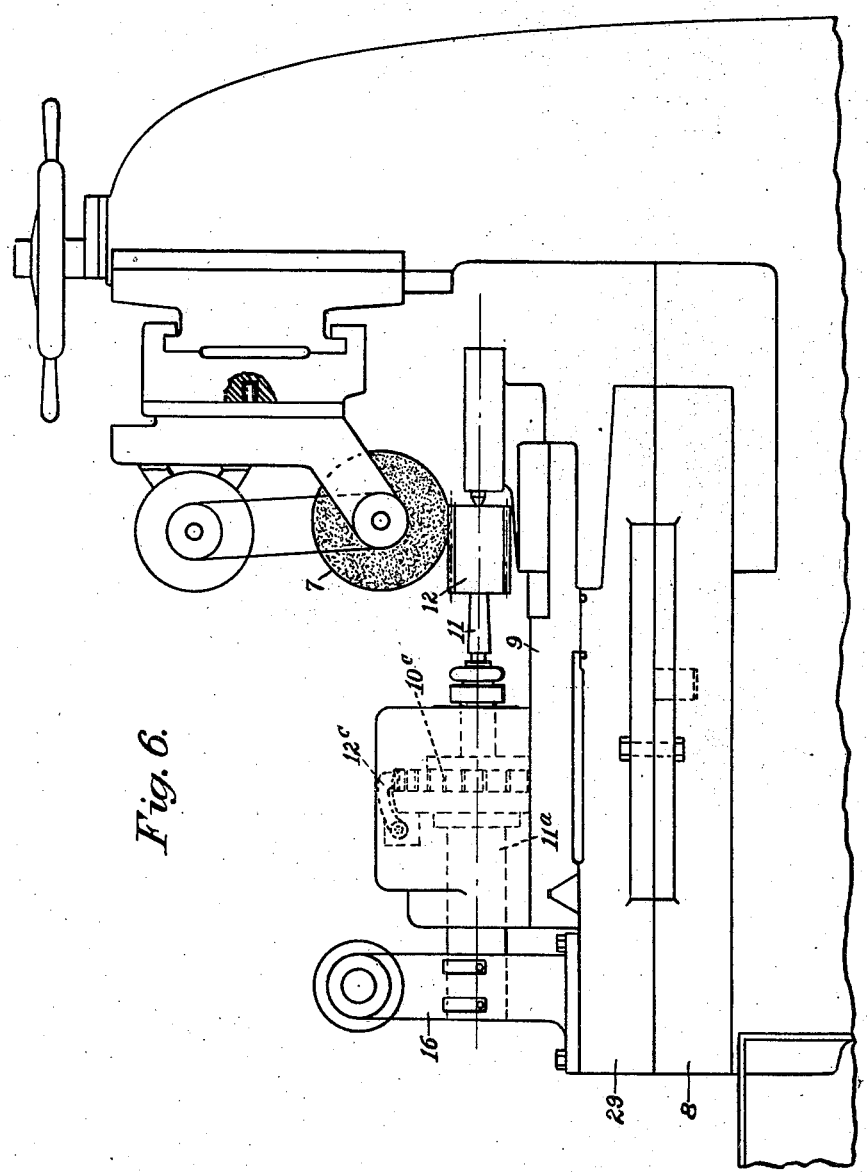

Aug. 9, 1932. A. AEPPLI 1,870,764
HELICAL GEAR GRINDER
Filed Dec. 2, 1930 8 Sheets-Sheet 7
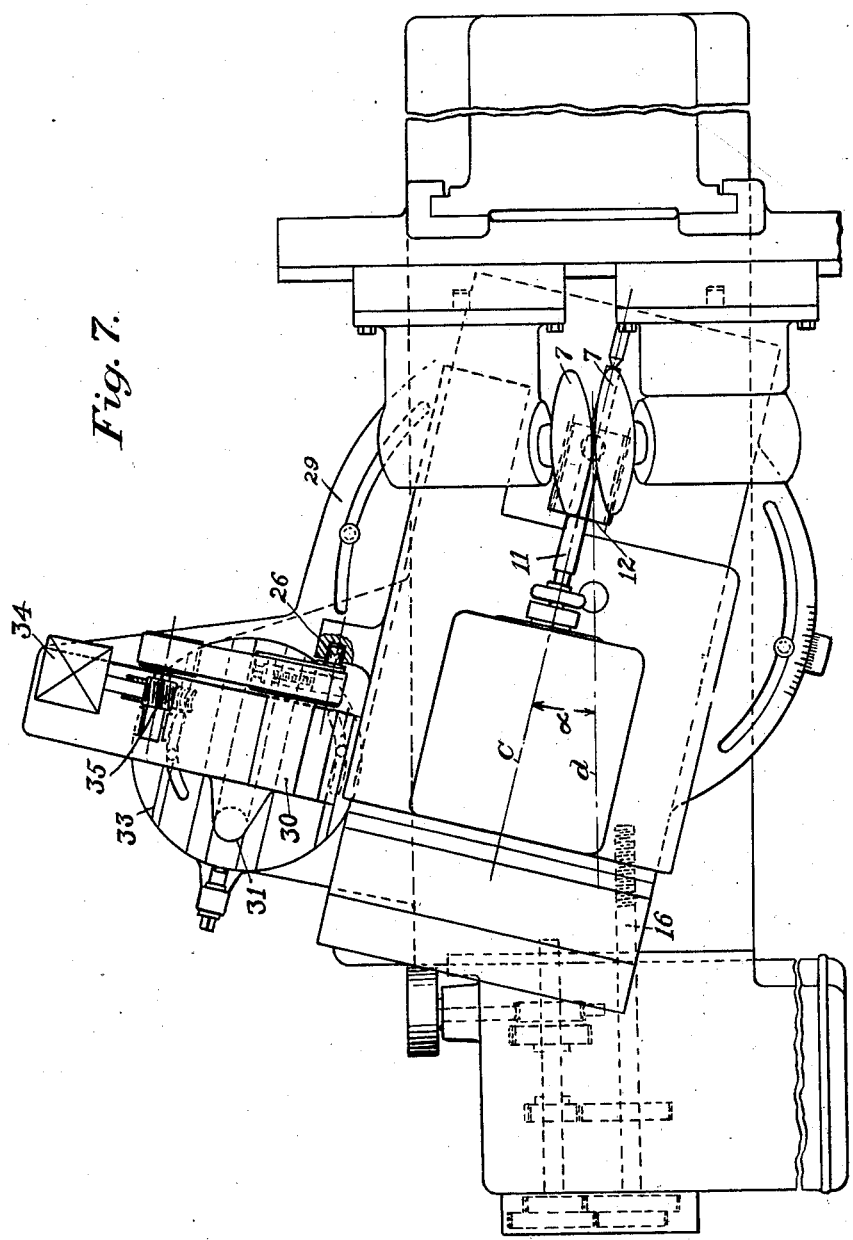
INVENTOR
Albert Aeppli
BY
Joseph N. Schofield
ATTORNEY

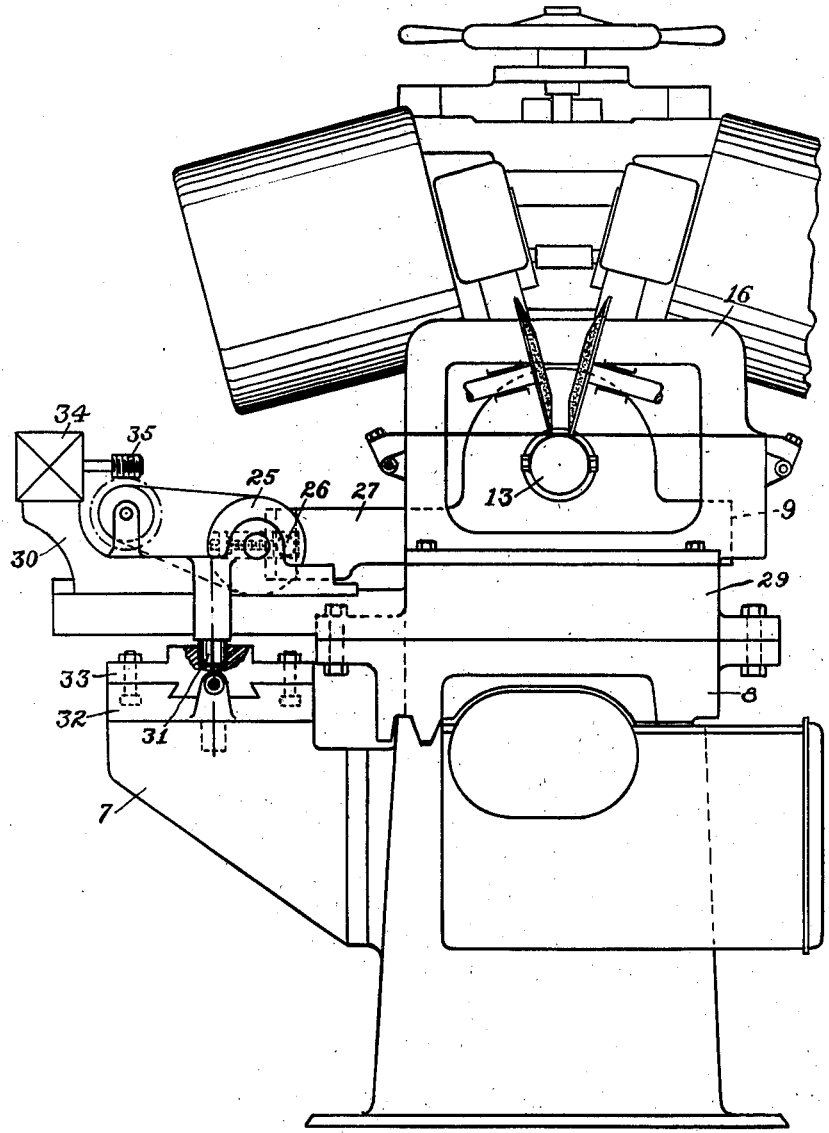

Patented Aug. 9, 1932

1,870,764

UNITED STATES PATENT OFFICE

ALBERT AEPPLI, OF ZURICH, SWITZERLAND, ASSIGNOR TO HENRY S. OTTO AND HENRY ESCHER, BOTH OF NEW YORK, N. Y.

HELICAL GEAR GRINDER

Application filed December 2, 1930, Serial No. 499,527, and in Germany March 8, 1930.

The invention relates to a machine for grinding involute tooth flanks of helical gears of any desired pitch, pressure angle and helix angle as well as grinding the teeth of spur gears by a rolling or generating process in which two thin grinding wheels with comparatively small grinding areas upon a side face of the wheels engage and grind respectively a right and a left flank of the same or closely adjacent teeth.

The particular form of the grinding discs makes it necessary, in addition to the rolling movement imparted to the gear being ground laterally relative to the grinding wheel, to provide an advancing movement for the grinding wheel along the line of the helix angle of the teeth along which the surface of the rolling cylinder is intersected by a tooth flank. The grinding wheels are set obliquely relative to the axis of the gear being ground so that their effective grinding areas or edges will each lie in a plane tangential to the line of the helix of the teeth. In addition these tangential planes of the grinding wheels are inclined to correspond to the angle of engagement or pressure angle of the teeth relative to the rolling cylinder. Thus it is possible with this machine to grind spur gears, helical gears or gears of any desired length of tooth and of all pitches and pressure angles which occur in practice.

The speed of the oscillatory motion of the gear being ground bears a difinite relationship to the speed of its advancing movement. One of these two motions, it is immaterial which, must always be executed in such a relationship to the other that the entire flank of the tooth is engaged and abraded by the small grinding edge of the grinding wheel without any part being left unground.

The above mentioned feed of the grinding wheel along the line of the helix of the gear being ground can be effected in various ways. As it is a case of relative motion between the gear to be ground and the wheel, it is preferable, particularly in machines for grinding small gears, that the blank being ground alone perform this motion.

The primary object therefore of the invention is to provide efficient but simple mechanism for effecting movements of the gear being ground relative to the abrasive wheel or wheels.

Another important object of the invention is to vary the limits of oscillation of the gear being ground during the advancing movement of the grinding wheels along the helix of the teeth so that the arc of oscillation may be maintained at a relatively low angle.

With the above and other objects in view, my invention consists in the features of construction and operation set forth in the following specification and illustrated in the accompanying drawings.

In the accompanying drawings annexed hereto and forming a part of this specification, I have shown my invention embodied in a grinding machine for helical gears having long teeth, but it will be understood that the invention can be otherwise embodied and that the drawings are not to be construed as defining or limiting the scope of the invention, the claims appended to this specification being relied upon for that purpose.

In the drawings:

Fig. 5 shows schematically the feed motion of the gear blank being ground with respect to the grinding wheels in the embodiment of the invention shown in Figs. 1, 2 and 3.

Fig. 6 shows a side elevation of a different embodiment of the invention.

Fig. 7 is a plan view of the embodiment shown in Fig. 6.

Fig. 8 is a front elevational view of the embodiment shown in Figs. 6 and 7, and Fig. 9 is a schematic representation of the feed motion of the blank being ground relative to the abrasive or grinding wheel in the embodiment of the invention shown in Figs. 6, 7 and 8.

In the above mentioned drawings I have shown several embodiments of the invention which are now deemed preferable, but it is to be understood that changes and modifications may be made within the scope of the appended claims without departing from the spirit of the invention.

Figure 1:
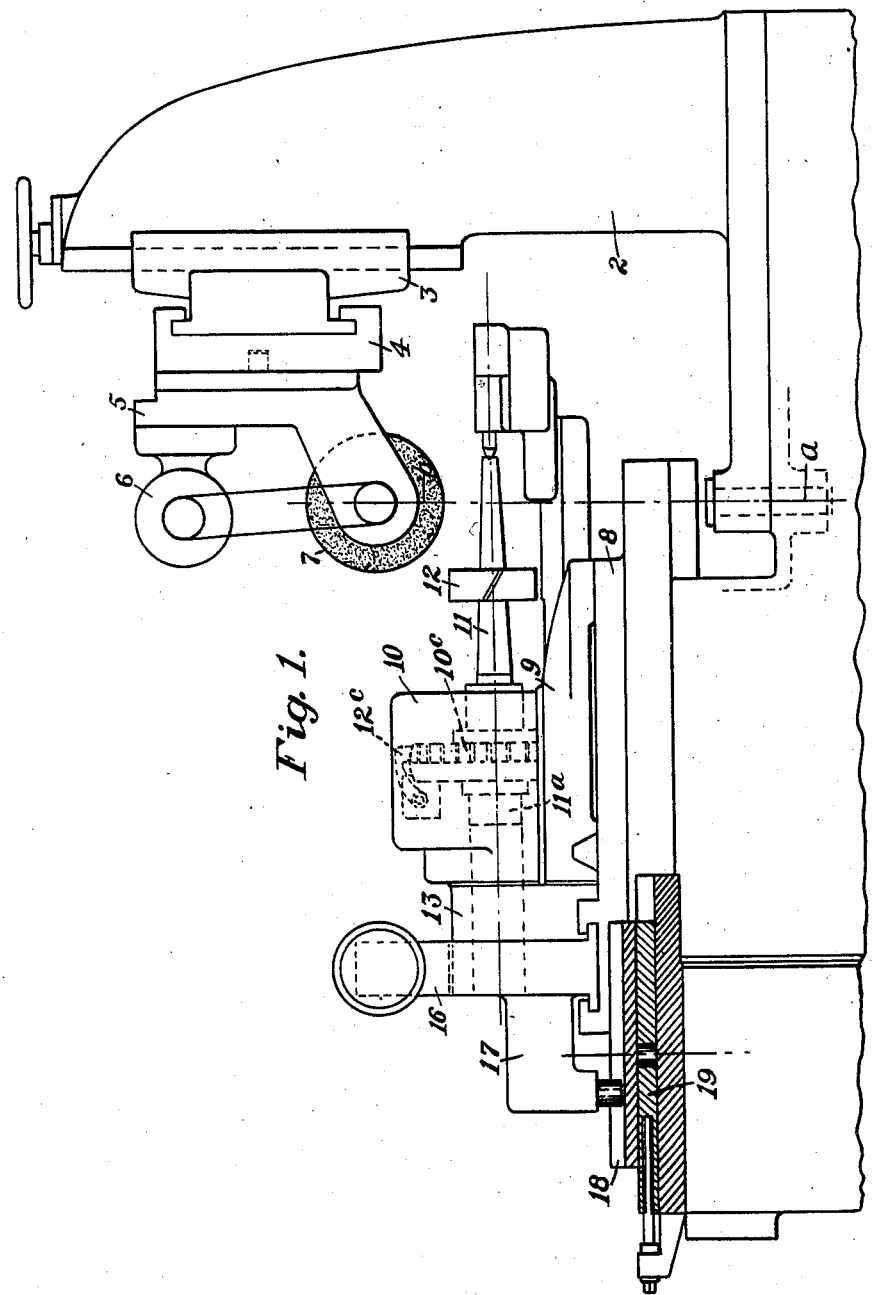
Figure 1 shows by way of example a side elevation of one embodiment of such a machine.
Figure 2:
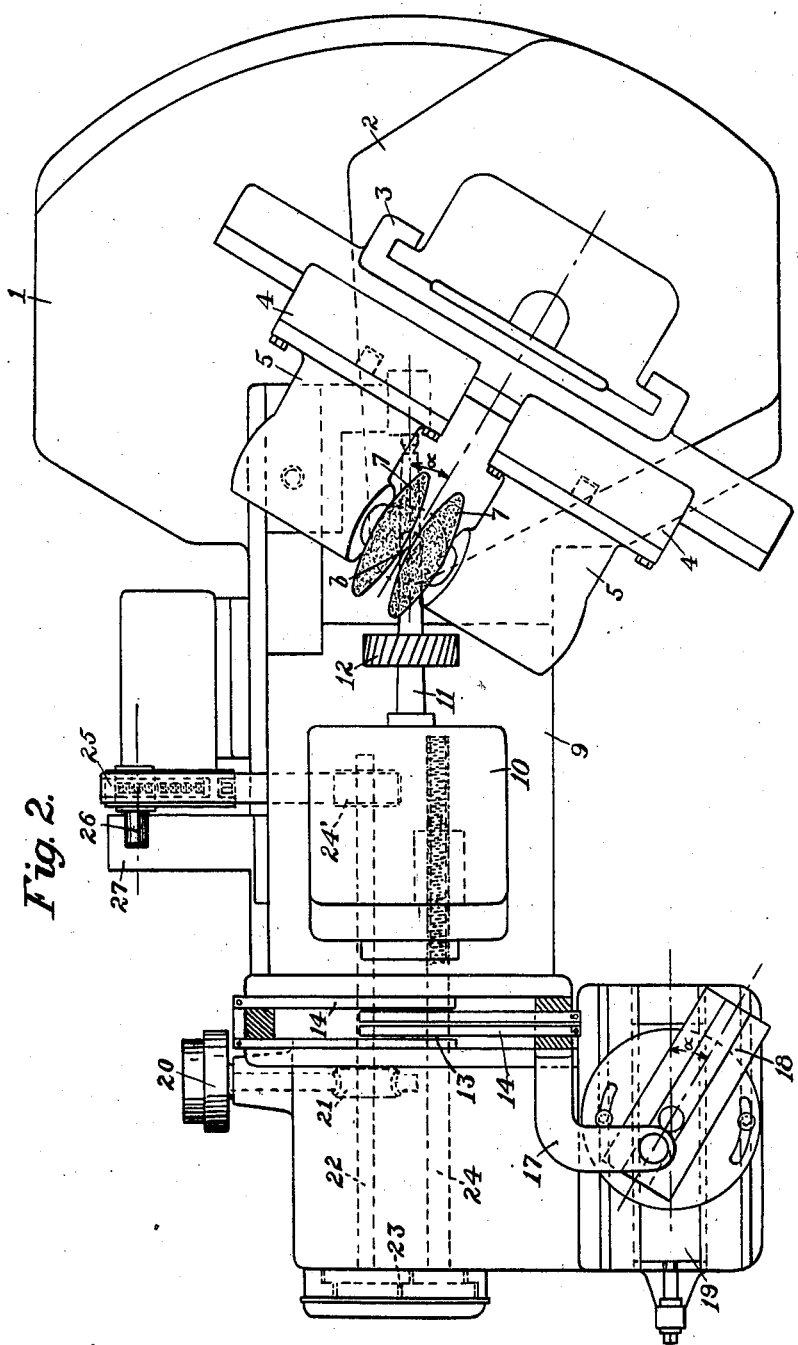
Fig. 2 is a plan view of the machine shown in Fig. 1.
Figure 3:
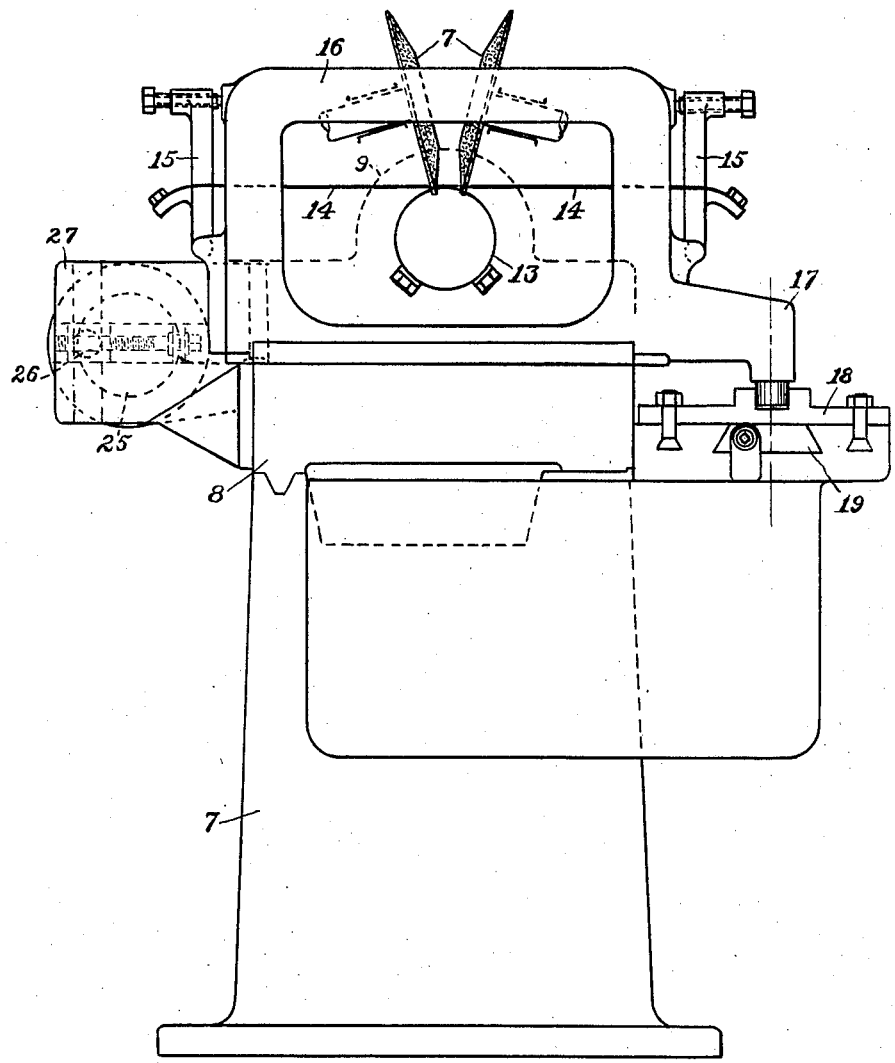
Fig. 3 is a front view of the machine shown in Figs. 1 and 2.

In the embodiment of the invention shown in Figs. 1, 2 and 3, 1 is the base of the machine on which a standard 2 is pivotally arranged for adjustment about a vertical axis $a$. At the front of the standard 2 is provided a vertical guideway on which may operate a vertically displaceable slide 3. This slide 3 has a horizontally extending guideway on which are carried two slides 4, each slide having a rotatable head 5 capable of being adjusted and clamped in any angular position. The driving motors 6 and the grinding wheels 7 in the form of thin abrasive discs are both mounted on the slides 5. The axis $a$, about which the support 2 is pivotally adjustable, coincides with the vertical axis of symmetry $b$, of the two grinding wheels 7.

The feed slide 8 moves in a direction toward and from the grinding wheels on a horizontal guideway provided on the machine bed 1. This slide 8 is provided with further horizontal guides or ways disposed at right angles to the direction of feed motion of the slide and on these ways is carried the headstock slide 9 within which is mounted the spindle carrying the gear being ground. In the housing 10 of the slide 9 is provided a dividing or indexing plate or disc 10$^c$ for the spindle or mandrel 11. The mandrel 11 is rigidly connected within housing 10 with a rotatably journaled indexing shaft 11$^a$. As this indexing mechanism and its connection to the mandrel 11 forms no part of the present invention, further description is not thought necessary. The gear 12 which is to be ground is mounted on the mandrel 11 in the vicinity of the grinding wheels 7. The shaft 11$^a$ within the housing 10 having a pawl 12$^a$ engaging in the dividing disc or plate 10$^c$ carries on its free end, projecting from the housing 10, the rolling arc 13 to which two oppositely extending pairs of bands 14 are secured. The outer ends of these bands 14 are connected by way of an adjustable tension device 15 with the frame 16 which slides on the feed slide 8 in a direction normal to the direction of feed, i. e., in the direction of the bands 14. The displacement laterally back and forth of the frame 16 is effected by means of the arm 17, the outer end of which engages in a guide 18 which is rotatably and adjustably mounted on a slide 19. This slide 19 also can be adjusted longitudinally of the machine on a portion of the frame 1 of the machine.

The machine is driven by means of a cone pulley 20 which drives the shaft 22 by way of a worm gear 21 secured to the shaft 22. From the shaft 22 the screw 24 is driven by means of intermeshing gears 23 secured on the forward ends of the shaft 22 and screw 24. This screw 24 controls the motion of the feed slide 8 by means of a nut secured within the slide 8. A pulley 24' is secured to the inner end of the shaft 22 and drives a crank disc 25 which is journaled in the feed slide 8. The crank pin 26, the position of which may be adjusted within the diametral slot cut with the disc 25, engages within a slot in a counter-member 27 secured on the slide 9 and thus produces in a certain path an alternate transverse motion of the slide 9.

A novel feature of this form of the machine is the setting of the grinding wheels 7 angularly relative to the axis of the mandrel 11 to the obliquity or helix angle of the teeth being ground. This is effected by swinging the standard 2 about the axis of the line $a$—$b$, means being provided to measure the angle to which the standard 2 has been adjusted and clamped. The inclination of the effective grinding plane of the wheels 7 corresponds to the pressure angle of the gear teeth being ground. The diameter of the rolling arc 13 engaged by the bands 14 is chosen so that it will be equal to the diameter of a pitch diameter of the gear being ground, diminished by the thickness of a band 14. The guide 18 controlling the transverse movement of the frame 16 supporting the bands 14 during its advancing or feeding movement is set at the same angle as the standard 2.

It has already been mentioned that the speed of the feeding movement and of rotation of the gear being ground cannot be chosen arbitrarily, but are interdependent. In consequence of the smallness of the effective grinding edge of the two grinding wheels 7 one of the two motions must always be chosen slow enough that the entire profile of the tooth will be completely acted upon by the wheels 7 and their contours will be ground sufficiently to exactly correspond with the theoretically deduced form of the tooth. Consequently two different methods of grinding are possible. In the first case the rolling motion of the mandrel 11, that is, the alternate transverse motion of the slide 9 producing this motion, may be effected rapidly in comparison with the slow advancing motion of the slide 9 so that the area covered by each grinding operation, which takes place during a half rotation of the crank disc 25, is contiguous with a preceding area. In the second process the speed of feed or advancing movement of the slide 9 may be made relatively great in comparison with the speed of oscillation of the mandrel 11 so that during a single grinding operation through one tooth profile a plurality of longitudinal feed motions in changed positions of the mandrel may occur. In this method the grinding wheels 7, at each traverse, grind a tangential surface on the line of the helix. The oscillatory motion is effected sufficiently slowly for successive tangential faces to conform with sufficient accuracy to the theoretically correct form of the tooth desired to be ground.

In the embodiment of the invention shown in Figs. 1 to 5, inclusive, the longitudinal feed motion is effected by displacing the gear 12 which is being ground while the abrasive wheels 7 are maintained stationary. Consequently the teeth on the gear being ground must be caused to pass along the helix angle of the gear blank past the operative edges of the grinding wheels 7. Thus the feed motion has two components, namely a rectilinear motion in the direction of the axis of the gear 12 and a simultaneous rotary motion, these motions of the gear blank being in addition to the oscillatory motion induced by the bands 13. The latter is caused by displacement of the frame 16 in the direction of the bands 14 which are connected thereto and to the rolling arc 13. The magnitude of this displacement in relation to the advance of the feed slide 8 carrying the frame 16 is determined by the oblique position to which the guide 18 is adjusted. As the rolling arc 13 together with the superimposed bands 14 correspond exactly to the helix angle of the teeth on the gear being ground, the angle $\alpha$ which the guide 18 forms with the longitudinal axis of the machine must be equal to the helix angle also. Fig. 5 shows more precisely the relationship between the guide 18 and the gear being ground. During a longitudinal feed $v$ of the slide 8 the gear 12 is rotated through a distance $w$ measured on the rolling cylinder $z$ and $$\frac{dw}{dv} = \tan \alpha$$

As the rotative motion is induced by lateral movement of the frame 16 supporting the bands 14, the inclination of the guide 18 to the longitudinal axis must also be equal to $\alpha$. The position of the gear blank 12 on the grinding mandrel 11 determines the position of the guide pin of the arm 17 in the guideway of the guide 18. The available length of guideway of this guide 18 as well as the available amount of oscillation of the mandrel 11 within the space between the frame 16 is limited. In order to position them efficiently for any gear being ground, the slide 19 may be positioned longitudinally so that for any gear being ground the central portion of the guide 18 will be engaged by the pin extending downward from the frame 17.

Figure 4:
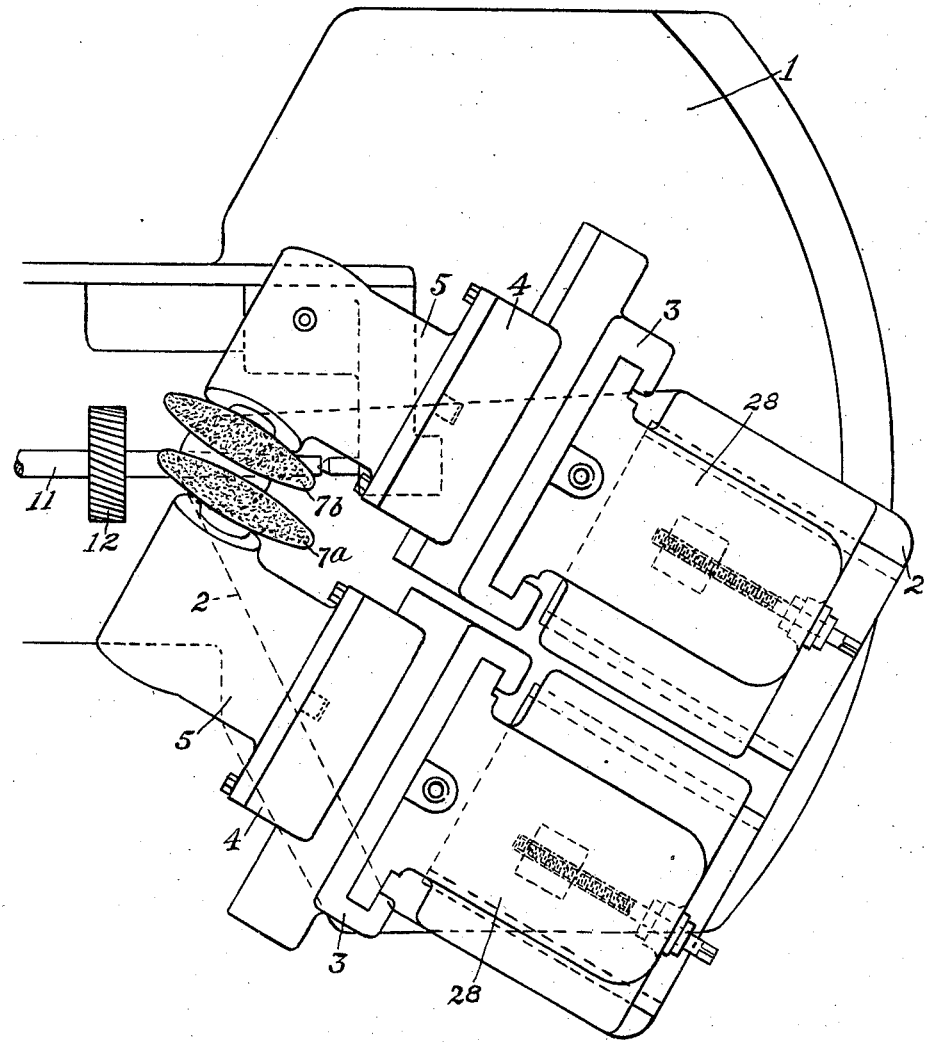
Fig. 4 shows a partial plan view of the machine shown in Figs. 1, 2 and 3 but having a modified construction for supporting and individually adjusting the grinding wheels.

During the grinding of the gear blank 12, in consequence of the oblique position of the two grinding wheels 7 as shown in Fig. 2, one wheel commences its grinding operation before the second and the second wheel is the last to cease to grind at the end of the longitudinal advancing movement of the slide 8. Consequently a loss of time arises with the grinding wheels so disposed as the advancing movement of the slide 8 is increased. In order to avoid this loss of time the machine may have its wheel supports constructed as shown in Fig. 4. In this modification 11 indicates the grinding mandrel with the gear blank 12 to be ground, which may be similar to the mandrel shown in Figs. 1, 2 and 3, and $7a$, $7b$ the two grinding wheels. Two vertically adjustable slides 3 are provided which, differing from the first embodiment, are arranged on individually horizontally displaceable slides 28 on the standard 2. This makes it possible to advance the grinding wheel $7b$ relative to wheel $7a$ such an extent that it becomes operative and ceases to operate simultaneously with the wheel $7a$ when grinding gears of any helix angle.

A further embodiment of the invention is shown in Figs. 6, 7 and 8. In this case the two grinding wheels 7 are maintained at all times in positions parallel to the longitudinal axis of the machine, the gear 12 being ground having its axis positioned obliquely in accordance with the helix angle of its teeth. For this purpose the feed slide 8 carries an adjustable and rotary saddle portion 29 which may be clamped in any oblique position. The upper surface of this portion 29 is provided with ways on which the slide 9 performs its transverse motions. The other parts of the slide 9 are or may be constructed as in the first embodiment and also provided with a similar grinding mandrel 11 carrying the gear 12 being ground.

The rotary member 29 must naturally be so adjusted that the axis $c$ of the grinding mandrel 11 is inclined to the longitudinal axis $d$ of the machine at the helix angle $\alpha$ of the teeth on the gear blank being ground. When during the grinding operation the slide 8 together with the gear 12 is advanced, the outermost edge of one grinding wheel commences the grinding operation for example at the crest of a tooth and gradually approaches the root until it is tangential to the root circle cylinder and is then withdrawn therefrom. If grinding is effected according to the first of the methods mentioned above with respect to the embodiment shown in Figs. 1, 2 and 3, that is, with rapid rolling motion and comparatively slow advance movement, then the outermost edge of the grinding wheels must be tangential to the root circle once during each time reciprocatory motion of the slide 9 is effected. This relation between the blank 12 and the wheels 7, to avoid loss of time by reducing the amount of rolling motion necessary, should take place with both grinding wheels at the same spacing from the mean position of the slide 9. For this purpose the transverse motion of the slide 9 must be constantly displaced depending upon the longitudinal advance of the slide 8 and the helix of the teeth being ground. It will be seen from Fig. 9 that at any moment the relationship between the displacement $w$ and the feed $v$ of the slide 9 is equal to sin. $\alpha$ where $\alpha$ is the helix angle of the teeth. In the embodiment described by way of example this displacement is effected by a movement of the member 30 carrying the crank pin 26 controlling the length of transverse motion of the slide 9. This member is adjustable perpendicularly to the axis of the gear 12. A rotary table 32 is provided on the bed 1 of the machine and slide 33 can be adjusted on this table. The slide 33 is provided with a guideway to receive the pin 31 connected with the member 30. The disc 25 carrying the pin 26 controlling the stroke of the slide 9 engages, by means of its pin 26, with a co-operating member 27 carrying a recess for the pin 26 fixed on the slide 9. The disc 25 may be driven as by means of the motor 34 by way of an intermediate gearing 35 and a belt.

The table 32 may be so adjusted that the guideway of the slide 33 will be parallel to the axis of the gear 12 being ground. This adjustment also makes an angle $\alpha$ with the axis of the machine. In this way the displacement of the stroke disc carrier 30 in a direction perpendicularly to the axis of the wheel 25 has the relationship of sin. $\alpha$ to the longitudinal feed of the slide 8. On pivoting the rotating part 29 the pin 31 also may be disengaged from the guideway of the slide 33. In order to prevent this the latter may be adjusted rearwardly a corresponding amount in the guide table 32.

Both embodiments are adapted primarily for machines for grinding operations upon small gears. If large and heavy helical gears are to be ground, the arrangement may then preferably be such that the gear executes only a rotary or rolling motion, whereas the longitudinal feed as well as all other motions may be performed by the grinding wheels 7. Also the rolling motion imparted to the gears 12 being ground can also be effected by means other than rolling arcs 13 and co-operating flexible bands 14, for example by means of a rack and pinion, or a worm and worm gear.

What I claim is:

1. A helical gear grinding machine comprising in combination, a base, a support thereon, abrasive wheels mounted on said support, a carriage movable on said base having a gear to be ground rotatably mounted thereon, means to reciprocate said carriage in one direction during an advancing movement thereof in a direction normal thereto, means to effect oscillation of said gear by the reciprocatory movement of said carriage, and means to vary the oscillated positions of said gear progressively during the advancing movement of said carriage.

2. A helical gear grinding machine comprising in combination, a base, a support thereon, abrasive wheels mounted on said support, a carriage movable on said base having a gear to be ground rotatably mounted thereon, means to reciprocate said carriage transversely of said base during an advancing movement thereof toward said wheels, means to effect a rolling movement of said gear by the lateral reciprocatory movement of said carriage, and means to vary the oscillated positions of said gear transversely of the base in accordance with the helix angle of the gear during the advancing movement of said carriage.

3. A helical gear grinding machine comprising in combination, a base, a support thereon, abrasive wheels mounted on said support, means to angularly adjust said support, a carriage movable on said base having a gear to be ground rotatably mounted thereon, means to transversely reciprocate said carriage during an advancing movement thereof, means to effect oscillation of said gear by the reciprocatory movement of said carriage to simulate a rolling motion of said gear, and means to rotatively vary the oscillated positions of said gear during the advancing movement of said carriage.

4. A helical gear grinding machine comprising in combination, a base, a support thereon, abrasive wheels mounted on said support, means to angularly adjust said support and wheels, a carriage movable on said base having a gear to be ground rotatably mounted thereon, means to reciprocate said carriage transversely during an advancing movement thereof toward said wheels, means to oscillate said gear during the advancing movement of said carriage to simulate a rolling motion of said gear, and means to progressively vary the oscillated positions of said gear during the advancing movement of said carriage.

5. A helical gear grinding machine comprising in combination, a base, a support thereon, abrasive wheels mounted on said support, a carriage movable on said base, a spindle in said carriage, a gear to be ground rotatably mounted thereon, means to reciprocate said carriage during an advancing movement thereof, means to oscillate said spindle during advancing movements of said carriage, oppositely extending bands on said spindle, a frame supporting the opposite ends of said bands, and means to progressively vary the position of said frame during the advancing movement of said carriage.

6. A helical gear grinding machine comprising in combination, a base, a support thereon, abrasive wheels mounted on said support, a slide movable on said base, a carriage laterally movable on said slide, a spindle in said carriage, a gear to be ground rotatably mounted thereon, means to reciprocate said carriage laterally during an advancing movement thereof on said slide, means to oscillate said spindle during the advancing movement of said carriage, and means to progressively vary the oscillated positions of said spindle in accordance with the helical angle of the gear during the advancing movement of said carriage.

7. A helical gear grinding machine comprising in combination, a base, a support thereon, abrasive wheels mounted on said support, a carriage movable on said base, a spindle in said carriage, a gear to be ground rotatably mounted thereon, means to reciprocate said carriage laterally during an advancing movement thereof, means to oscillate said spindle during reciprocatory movement of said carriage, a laterally movable frame flexibly connected to said spindle, an angularly adjustable plate having a guideway thereon engaged by said frame, whereby the oscillated position of said spindle during the advancing movement of said carriage is varied according to the adjustment of said plate.

8. A helical gear grinding machine comprising in combination, a base, a fixed support thereon, abrasive wheels mounted on said support, a slide on said base movable toward and from said wheels, an angularly adjustable saddle on said slide, a carriage on said slide, a spindle therein, a gear to be ground rotatably mounted on said spindle, means to reciprocate said carriage on its saddle during an advancing movement of said slide, oppositely extending bands attached at one end to said spindle, a frame movable on said slide and having the opposite ends of said bands attached thereto, and an angularly adjustable member on said base engaging said frame, whereby the lateral positions of said carriage may be varied progressively during the advancing movement thereof.

In testimony whereof, I hereto affix my signature.

ALBERT AEPPLI.